United States Patent [19]

Ferretti

[11] 3,988,252

[45] Oct. 26, 1976

[54] PROCESS FOR THE PRODUCTION OF BA(SR)FCL:EU PHORPHORS

[75] Inventor: August Ferretti, Wilmington, Del.

[73] Assignee: E. I. Du Pont de Nemours and Company, Wilmington, Del.

[22] Filed: Nov. 11, 1974

[21] Appl. No.: 522,880

[52] U.S. Cl. .......................................... 252/301.4 H
[51] Int. Cl.$^2$............................................. C09K 11/46
[58] Field of Search ............................... 262/301.4 H

[56] References Cited

UNITED STATES PATENTS

| | | | |
|---|---|---|---|
| 2,303,963 | 12/1942 | Uhle | 252/301.4 H |
| 3,243,381 | 3/1966 | Yocom | 252/301.4 H |
| 3,448,056 | 6/1969 | Chenot | 252/301.4 H |
| 3,668,143 | 6/1972 | Luckey | 252/301.4 H X |
| 3,702,828 | 11/1972 | Hoffman | 252/301.4 H |

OTHER PUBLICATIONS

Sommerdijk et al. "Chem. Abstracts", vol. 81, 1974, p. 70658s.
Tanguy et al. "Chem. Abstracts", vol. 81, 1974, p. 43625x.
Goldsmith et al. "Tech Report AFML-TR-65-115", 1965 pp. 10-12.

*Primary Examiner*—Jack Cooper

[57] ABSTRACT

Phosphors of the formula $Ba_{1-x-y-z}Sr_xEu_yR_zFCl$ when R is one or more of Sm, Dy, Sb, Bi or Zn, $x$ is from 0 to 0.1, $y$ is from 0.0001 to 0.2 and $z$ is from 0 to 0.1 having high efficiency and low lag are made by (1) intimately mixing a substantially stoichiometric mixture of the appropriate metal halides having at least 30% of particles less than $1.5\mu$ with the remaining particles having an average particle size less than $3\mu$ (2) firing in an atmosphere free of hydrogen at 600° to 950° C for a time sufficient to effect reaction and (3) pulverizing the sintered product. Suitable intimate mixtures of the starting materials can be prepared by (a) prolonged ball milling of the ingredients in the presence of certain organic liquids followed by filtration and drying or (b) slurrying insoluble fluoride powders with an aqueous solution of soluble chloride powders followed by precipitation with an excess of a water miscible organic solvent or (c) freeze-drying a thick aqueous slurry of the ingredients.

7 Claims, No Drawings

PROCESS FOR THE PRODUCTON OF Ba(Sr)FCl:Eu PHOSPHORS

BACKGROUND OF THE INVENTION

1. Field of the Invention

This invention relates to the preparation of phosphors having as their principal component Eu doped BaClF.

2. The Prior Art

The copending, commonly assigned application of Lothar H. Brixner U.S. Ser. No. 414,290 filed Nov. 9, 1973 describes selected strontium and barium europium fluoride halides as phosphors. Additives which reduce lag are also described.

Although high quality material can be produced following the teachings of Brixner, consistant results are not always obtained in the manufacture of larger batches.

In view of the improved efficiency and desirable emission of this phosphor in X-ray screens, it is desirable to provide a method of constantly producing high quality material.

SUMMARY OF THE INVENTION

The process of the present invention is a method of making a powdered composition of the formula

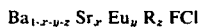

$$Ba_{1-x-y-z} Sr_x Eu_y R_z FCl$$

wherein

R is Sm, Dy, Bi, Sb, or Zn; $x$ is from 0 to 0.1; $y$ is from 0.0001 to 0.2 and $z$ is from 0 to 0.1 which comprises a. preparing an intimately mixed substantially stoichiometric mixture of powdered metal chlorides and fluorides to provide said composition including trivalent Eu, Sm and Dy halides, said mixtures having at least 30% of particles below $1.5\mu$ with the remainder of the particles having an average size of less than $3\mu$, preferably less than $2\mu$, as determined by an optical particle size analyzer.

b. firing said mixtures in an atmosphere of nitrogen, noble gases, carbon dioxide, carbon monoxide or mixtures thereof, and free of hydrogen, to maintain a temperature in the range of 600° to 950° C, preferably 750°–900° C for a time sufficient to effect reaction whereby a compacted mass of particles is formed.

c. pulverizing said compacted mass.

Several methods can be used to make the intimate mixture of step (a).

In the first method the anhydrous halides are ball-milled in the presence of an organic liquid which is preferably acetone, ethanol or azeotropic mixtures of trichlorotrifluoro ethane with acetone, ethanol or methanol, or 2-ethoxyethanol in tetrachloroethylene until the desired particle size is obtained.

In the second method the water insoluble powders having an average particle size of about $3\mu$ are slurried with an aqueous solution containing the soluble powders. Sufficient acetone is then added to precipitate substantially all of the dissolved material.

With either method the solids are separated from the liquid by filtration, washed and dried prior to use in step (b).

Yet another method of forming the desired intimate mixture of particles is to wet a fine powder of insoluble metal halide components with a sufficient amount of a concentrated aqueous solution of soluble components to form a thick slurry containing the correct proportion of ingredients and freeze-drying said slurry.

DETAILED DESCRIPTION OF THE INVENTION

Europium doped barium fluoride chloride offers outstanding advantages as an X-ray phosphor. First the emission of light occurs in the violet and ultraviolet region of the spectrum which is especially convenient for use with X-ray films, and occurs with substantially greater efficiency than is obtained with calcium tungstate which has been widely employed in the production of X-ray screens. The material also exhibits excellent stopping power for X-rays.

For successful use in an X-ray screen, particularly in medical X-ray technology, it is important that the phosphors be essentially free of lag, or delayed fluorescence. In typical practice, the film employed to record the X-ray image is in contact with the phosphor screen for a relatively long time compared wih the exposure time required. Thus even a small amount of lag in the screen can cause degradation of the image or multiple images.

It has been discovered that europium doped barium chloride fluoride phosphors which produce high efficiency prompt emission, but very low lag can be produced consistantly provided certain essential requirements are met.

The first requirement is that the starting materials be pure and intimately mixed in the form of fine particles.

The second requirement is that the firing be conducted at the proper temperature and in the proper atmosphere. The use of hydrogen in particular as an atmosphere has been found to produce compositions with high leg, and should be avoided. Preferred atmospheres are nitrogen, noble gases, carbon monoxide or carbon dioxide.

The sintered mass is then pulverized by milling dry, milling with any of the liquids employed in the first step for milling, or water. When water is employed, in many instances simple ultrasonic agitation is all that is required to pulverize the sintered mass.

Following pulverization the product can optionally be treated with water and rinsed with solvents such as acetone to remove water and dried.

Sieving may also be employed to further clarify the particles to obtain suitable products for the preparation of X-ray screen.

The bulk of the impurities appear to occur as second phase materials in the grain boundaries of the sintered compacts. Removal of some of this material is encompassed in the preferred methods of reducing the sintered compacts to the desired powder form.

The starting materials are generally employed in reagent grade. Materials such as $BaF_2$, $SrF_2$ or $EuF_3$, the preferred source of europium, can be readily obtained in the form of fine powder having average dimensions of about $3\mu$, or can be readily reduced to suitable dimensions. Anhydrous $BaCl_2$ generally has larger mean particle dimension and substantial wet ball milling may be required to reduce the particle size of this material to the desired dimension. Experiments with pure $BaCl_2$ and mixtures of $BaCl_2$ with other ingredients have shown that the principal effect of the milling is to reduce the particle size of the larger particles. The effect of wet ball milling with acetone of particle size is shown in Table I.

Table I

| Time, min | Particle size of BaCl₂ after milling in acetone.* | | |
|---|---|---|---|
| | Average Size μ | Median μ | Fines<1.5μ |
| 0 | 13.8 | 8.6 | 0 |
| 15 | 6.6 | 6.1 | 30% |
| 30 | 5.2 | 2.9 | 30% |
| 75 | 5.1 | 2.8 | 35% |
| 120 | 3.9 | 2.7 | 35% |

*Measured by a "Quantimet" optical particle size analyzer. Thus in one embodiment of the mixing process, the anhydrous starting materials are ball-milled with from about 1 to 5 parts by weight of a nonaqueous liquid selected from acetone, trichlorotrifluoroethane (Freon TF), or one of the approximately azeotropic mixtures consisting of 80%–96% Freon TF/Ethanol 20%–4% : 85%–96% Freon TF/Acetone 15%–4% : 85%–96% Freon TF/Methanol 15%–4% : tetrachloro ethylene 90%/2-ethoxyethanol 10%, which is preferred, where percentages are volume percentages.

Milling is conducted in a ceramic or other nonmetallic ball mill for a period generally of at least 3 hours to 140 hours or more.

After milling the solids are filtered from the milling liquid, washed with further clean milling liquid, then dried preferably in vacuum at a temperature above the boiling point of the liquid but well below the sintering temperature.

The selection of the milling liquid is important in this process, since it appears to remove, at least in part, impurities which can impart color to the finished product. All of the aforesaid liquids have been found suitable for use in producing high grade product. The preferred liquid is the tetrachloroethylene/2-ethoxyethanol mixture which has been described heretofore in German Auslegeschrift No. 2,158,075 as a noninflammable azeotrope useful for cleaning electonic components.

In addition to removing trace impurities the above liquids also assist in removing trace amounts of water which may be associated with the components of the phosphor.

An alternate procedure which avoids prolonged milling of the ingredients, is based on the discovery that although barium chloride is percipitated from aqueous solutions in the form of particles exceeding 10μ by the addition of water-miscible organic solvents, when the precipitation is carried out in the presence of a slurry of the finely divided insoluble powders, the barium chloride is likewise obtained in finely divided form. For example, precipitation of $BaCl_2$ from 10% by weight aqueous solution by the addition of five volumes of acetone yields particles with an average particle size of 14.8μ and a medium particle size of 13.1μ. When the same process is conducted in the presence of $BaF_2$, $SrF_2$ and $EuF_3$ in the proportions 45 parts $BaCl_2$, 45 parts $BaF_2$ 5 parts $SrF_2$ and 5 parts $EuF_3$, the particle size of the mixture obtained has an average of 1.9μ and a median of 1.6μ, i.e., slightly lower than the values of 2.1 average and 2.3 median found for the $BaF_2$ employed.

Material thus precipitated can be filtered, washed dried and fired to produce acceptable phosphor according to the present invention.

The firing procedure is also critical to the production of useful phosphor. Firing temperatures as low as 600° C have been employed and produce material which has very low lag, however, when material is fired at low temperatures such as 600° C the prompt emission is substantially lower than that of material fired at higher temperatures. Firing can be conducted at temperatures as high as 950° C, however, above 900° C the lag found for the product appears to increase with increasing temperatures. Thus it is preferred to employ a firing temperature of 750° to 900° C and most preferably from about 850° to 900° C.

The material is fired in boats which can be constructed of boron nitride, vitreous carbon, graphite, mullite, or suitable oxide ceramics. The preferred boats are constructed of vitreous carbon or graphite.

Firing is conducted in the presence of an atmosphere of nitrogen, noble gases, carbon dioxide, carbon monoxide or mixtures thereof. While carbon monoxide or carbon dioxide (which substantially dissociates to carbon monoxide and oxygen) can be used, the toxicity of carbon monoxide makes their use less attractive from a safety standpoint, and nitrogen or argon or other noble gases are preferred. As noted above, hydrogen, even in small amounts should be avoided.

As noted above, europium is preferably employed in the form of a trivalent compound, preferably $EuF_3$. This is reduced to the divalent form during the firing process even in the absence of a reducing atmosphere.

It is highly desirable that the mixture of phosphor powders should be placed in the boat in the flat layer not exceeding about 0.5 inches or 1 cm in depth to ensure that the sample is heated uniformly. The use of thicker layers may result in overheating the material in the center of the charge due to the heat of reaction evolved, with resultant degradation of the properties of the product especially in the lag.

The furnace employed can be any suitable furnace in which the atmosphere surrounding the sample can be controlled prior to and during residence in the heated zone. For example, belt-type furnaces where the sample and boat moves through a heated zone in a continuous manner on a belt are suitable. The sample residence time at maximum temperature can be from 2 min to 60 min or longer, with 10–15 minutes being the preferred time.

After firing, the samples are cooled down to room temperature under the protective gas stream.

The product obtained after the firing step is a sintered compact, the hardness of which depends on the composition, particle size, mixing and the firing time and temperature. High firing temperature and long firing times tend to make harder compacts.

Light mechanical milling may be employed alone or prior to liquid treatment to initiate pulverization of the compact.

The compacts can be reduced to a fine powder by a water treatment by either

A. Placing the compact in an ultrasonic water bath containing from 1 to 2 parts of water per part of compact, and agitating by ultrasonic waves for a period of 15 to 45 minutes. The water is then decanted, and the product dried.

B. The product can be tumbled in a ceramic ball mill jar with from about 1 to 5 parts of water per part of compact for 30 minutes to 60 minutes, then decanting, rinsing and drying. The water can be replaced by one of the milling liquids employed in the preparation of the firing mix.

The result, in any event is a fine powder having an average particle size of between 5μ and 20μ which is suitable for use as a phosphor. If desired, however, the material may be classified by conventional methods such as sieving to obtain the optimum size desired for a particular application.

SPECIFIC EMBODIMENTS OF THE INVENTION

This invention is further illustrated by the following examples which should not, however, be construed as fully delineating the scope of the discovery.

In these examples parts are by weight unless otherwise indicated. The following test procedures were also employed.

Particle Size

Particle size is determined using a "Quantimet" particle size analyzer.

Prompt Emission and Lag a. Sample preparation

The phosphor is sieved with a 200 mesh sieve, and the following components are measured into a 15cc vial containing 8 4mm diameter glass beads.

3.75 gm phosphor
1.00 ml butyl acetate
2.54 gm polyvinyl butyral binder (Cf U.S. 3,043,710).

The mixture is shaken on a Spex oscillatory-type shaker for 15 minutes, then immediately coated on a pigment board using a Goodner mechanical coater and a 10 mil draw-down knife. The resultant coating is dried in air for at least 15 minutes to give a dry coating $5 \pm 1$ mil ($130\mu \pm 25\mu$) in thickness. A 1 inch × 1½ inch sample is cut from the coated board and mounted on a pigment board with other samples and standards for exposure tests.

b. Sample Testing

The pigment board with the screen sample attached is inserted into an 8 inch × 10 inch (20.3 cm × 25.4 cm) cassette containing a sheet of high speed medical X-ray film, in this instance Cronex 4 film. A prompt emission exposure of 0.6 m.a.s. (0.24 sec, 25 m.a. 80 Kvp) is made at either 25 inches or 50 inches from a tungsten source filtered by ¼ inch aluminum. The film is then removed and processed in a automatic rapid processor which was operated at 33° C and contained the standard p-N-methylamino hydrosulfate/hydroquinone developer, with a total processing time of 90 seconds (develop, fix, wash and dry). The optical density of the exposed and developed film is determined using a Macbeth digital densitometer and recorded as the prompt emission.

Lag is determined by exposing the samples to 400 m.a.S (200 m.a. 25 sec 80 KVP) X-rays from the same tungsten source, then after 15 seconds contacting the screen sample with a fresh piece of film for 5 minutes. The film is then developed and the optical density is measured as described above for prompt emission. The optical density so recorded is the lag.

Standards are run with each set of samples to ensure uniformity.

The background is determined by exposing a piece of the same X-ray film employed to determine lag to the lag exposure in the absence of any test screen. The difference between the background and lag is recorded as the net lag.

EXAMPLE 1

To a solution consisting of 13.360 gms of anhydrous barium chloride in 100 ml $H_2O$ in a glass breaker was added 9.181 gm $BaF_2$, 0.822 gm of $SrF_2$, 1.368 gm $EuF_3$. The breaker was placed in an ultrasonic bath and the contents agitated for 5 minutes. A slow stream of 500 ml acetone was added while agitating, and the agitation was continued for a further 5 minutes. The product was filtered on a Buchner filter, washed with acetone, dried on the filter for 1 hour then dried in a vacuum at 160° overnight.

The product was placed in a graphite boat and placed in one end of a tube having a furnace about its center, the tube was swept with nitrogen then the boat was moved to the heated zone of the tube and fired at 880° C for 1 hour after which the boat was pulled through to the cool end of the tube and allowed to cool under nitrogen.

The sintered compact with nominal composition $Ba_{0.9}Eu_{0.05}Sr_{0.05}$ FCl was placed in a beaker, covered with water (approximately 1 ml water/gm material) then agitated in an ultrasonic bath for 30 min. The compact was pulverized to a fine white powder which was filtered, washed with acetone, dried on the filter, then further dried in a vacuum over at 100° C for 1 hour. The product passing a 200 mesh screen was tested for prompt fluorescence and lag. At 25 inches prompt fluorescence was 2.64, lag was 0.68 with a net lag of 0.51.

EXAMPLE 2

The mixing procedure of Example 1 was employed except that 16.00 gm of $BaCl_2$ $2H_2O$ was used in place of the anhydrous $BaCl_2$. The resultant mixture was divided into two parts each of which was fired at 900° C, part A for 1 hour and part B for 15 minutes. The sintered compacts were as described in example 1. For part A the prompt emission in the 25 inch test was 2.58, lag was 0.56 with a net lag of 0.37. For part B the 25 inch prompt emission was 2.63, lag was 0.76 with net lag 0.51.

EXAMPLES 3–18

The following examples show the effect of milling the starting materials with various nonaqueous fluids to prepare the mixture for firing.

The nominal compositions, weights of starting material, the milling time and the liquid employed are shown in Table II. In each instance milling was conducted in a ceramic ball mill of approximately 1 liter capacity using alumina balls of about 1 cm and about 0.5 cm in diameter.

After milling the sample is filtered on a Buchner funnel, washed with fresh liquid, dried on the funnel about 1 hour, then further fried in a vacuum over at 160° C overnight.

The firing conditions and the X-ray fluorescence properties of the resulting materials are shown in Table III. Two types of furnaces were employed. In the first a stainless steel tube was equipped with a central oven. Boats containing the sample were placed in one, cool, end of the tube and after the appropriate atmosphere was established were moved to the heated central zone and fired at the times and temperatures stated. A belt furnace where the samples were moved through the furnace continuously was also employed. In that event the temperature profile of the furnace was determined and the maximum temperature and the time at which the sample was maintained at that temperature was recorded.

In some examples the charge shown in Table II was divided and portions were subjected to different firing conditions or other treatment as shown in Table III.

After firing the samples were pulverized either by dry milling, milling with a liquid or by placing the sample in a breaker with about an equal amount of water and subjecting the material to ultrasonic agitation for about 30 minutes. The pulverized material was then filtered, washed with acetone and dried. In most instances the product was screened and the material having a 200 mesh screen was employed for testing.

EXAMPLE 21

A thick slurry was formed consisting of 18.26 gm $BaF_2$, 1.64 gm of $SrF_2$, 2.62 gm of $EuF_3$ and 32.0 gm of $BaCl_2.2H_2O$ dissolved in 100 ml of water. The slurry was then freeze dried over about 3 days to produce a firm, intimate dry mixture with nominal composition $Ba_{0.90}Eu_{0.05}Sr_{0.05}FCl$. The mixture was fired at 880° C milled. The product passing a 200 mesh screen was tested. At 25 inches prompt emission was 2.40 with net lag of 0.07.

EXAMPLE 22

A thick slurry was formed consisting of 54.14 gm $BaCl_2.2H_2O$ and 5.02 gm of $SrCl_2\ 6H_2O$ dissolved in water to form an essentially saturated solution together with 38.86 gm of $BaF_2$ and 1.97 gm of $EuF_3$ for a nominal composition of $Ba_{0.94}Eu_{0.02}Sr_{0.04}FCl$ which was freeze dried over about 3 days. The resulting mixture was fired and pulverized as in Example 21. The 25 inch prompt emission was 2.56 with net lag of 0.23.

TABLE II

| Ex. | Nominal Comp. Sr x | Nominal Comp. Eu y | Nominal Comp. Sm z | $BaCl_2$ gm. | $BaF_2$ gm. | $SrCl_2$ gm. | $SrF_2$ gm. | $EuF_3$ gm. | $SmF_3$ gm. | Milling Vol. ml. | Milling Time Hrs. |
|---|---|---|---|---|---|---|---|---|---|---|---|
| 3 | 0.04 | 0.02 | | 54.66 | 40.50 | | 2.63 | 2.193 | | Acetone | 250 | 3 |
| 4 | 0.04 | 0.02 | | 54.66 | 40.50 | | 2.63 | 2.193 | | 10% 2-ethoxy ethanol 90% tetrachloro-ethylene | 250 | 3 |
| 5 | 0.05 | 0.05 | | 13.63 | 9.181 | | 0.822 | 1.368 | | 10% 2-ethoxy-ethanol 90% tetra-chloro-ethylene | 250 | 3 |
| 6 | 0.04 | 0.02 | | 54.66 | 40.50 | | 2.63 | 2.193 | | Acetone | 250 | 3 |
| 7 | 0.05 | 0.05 | | 13.63 | 9.181 | | 0.822 | 1.368 | | 10% 2-ethoxy-ethanol 90% tetrachloro-ethylene | 250 | 3 |
| 8 | — | 0.05 | | 13.454 | 10.195 | | — | 1.353 | | Freon TF | ~100 | 3 |
| 9 | 0.05 | 0.05 | | 54.518 | 36.722 | | 3.288 | 5.470 | | 94% Freon TF 6% Methanol | 200 | 3 |
| 10 | 0.05 | 0.05 | | 54.518 | 36.722 | | 3.288 | 5.470 | | Acetone | 150 | 3 |
| 11 | 0.05 | 0.05 | | 27.501 | 18.524 | | 1.658 | 2.759 | | Acetone* | 200 | 4 |
| 12 | 0.05 | 0.05 | | 27.501 | 18.524 | | 1.658 | 2.759 | | 94% Freon TF 6% Methanol | 200 | 4 |
| 13 | 0.05 | 0.05 | | 54.518 | 36.722 | | 3.288 | 5.470 | | Acetone | 250 | 3 |
| 14 | 0.05 | 0.05 | | 54.518 | 36.722 | | 3.288 | 5.470 | | 94% Freon TF 6% Methanol | 250 | 142 |
| 15 | 0.04 | 0.02 | | 54.665 | 40.503 | | 2.637 | 2.193 | | Acetone | 200 | 3 |
| 16 | 0.05 | 0.05 | 0.005 | 49.251 | 40.546 | 4.165 | — | 5.491 | 0.544 | Acetone | 200 | 4 |
| 17 | 0.05 | 0.05 | 0.005 | 24.625 | 20.763 | 2.083 | — | 2.746 | 0.272 | 89% Freon TF 11% Ethanol | 200 | 4 |
| 18 | 0.04 | 0.02 | — | 81.990 | 60.755 | — | 3.955 | 3.289 | | Acetone | 250 | 3 |
| 19 | 0.04 | 0.02 | | 54.66 | 40.50 | | 2.63 | 2.19 | | 10% 2-ethoxy. ethanol 90% tetrafluoro-ethylene | 250 | 3 |
| 20 | 0.05 | 0.05 | | 27.501 | 18.524 | | 1.658 | 2.759 | | Acetone | 150 | 4 |

*Rinsed with 1-propanol on filter.

for 15 minutes in nitrogen using a tube furnace and dry

TABLE III

| Ex. | Boat | Atmos. | Temp. °C. | Time Mins. | Pulverization | Furnace | 50" Prompt | 50" Net Lag | 25" Prompt | 25" Net Lag |
|---|---|---|---|---|---|---|---|---|---|---|
| 3 | Vitreous Carbon | $CO_2$ | 880 | 60 | Dry | Tube | | | 2.32 | 0.10 |
| 4 | Graphite | $N_2$ | 880 | 15 | Dry | Tube | | | 2.83 | 0.03 |
| 5A | Graphite | $N_2$ | 900 | 60 | Dry | Tube | | | 2.84 | 0.08 |
| 5B | Graphite | $N_2$ | 900 | 15 | Dry | Tube | | | 2.72 | 0.04 |
| 6 | Graphite | $N_2$ | 880 | 15 | Ultrasonic Water | Tube | | | 2.74 | 0.04 |
| 7 | Graphite | $N_2$ | 900 | 60 | " | Tube | | | 2.43 | 0.02 |
| 8 | Graphite | $N_2$ | 880 | 60 | " | Tube | | | 2.27 | 0.24 |
| 9A | | $N_2$ | 880 | 60 | Freon TF) Methanol) Mill 1 Hr. +325−200 Screen | Belt | 1.30 | 0 | | |
| 9B | | $N_2$ | 900 | 60 | " | Belt | 1.27 | 0.01 | | |
| | | $N_2$ | 930 | 60 | " | Belt | 1.40 | 0.01 | | |
| 9D | | $N_2$ | 880 | 30 | "Belt | | 1.27 | 0 | | |
| 9E | | $N_2$ | 900 | 30 | " | Belt | 1.50 | 0 | | |
| 9F | | $N_2$ | 930 | 30 | " | Belt | 1.52 | 0.03 | | |
| 9H | | $N_2$ | 900 | 15 | " | Belt | 1.24 | 0.03 | | |
| 9I | | $N_2$ | 930 | 15 | " | Belt | 1.33 | 0.02 | | |
| 10A | Vit.C | $N_2$ | 900 | 30 | Ultra- | Belt | 1.15 | 0 | 2.43 | 0.09 |

TABLE III-continued

| Ex. | Boat | Atmos. | Temp. °C. | Time Mins. | Pulverization | Furnace | 50" Prompt | 50" Net Lag | 25" Prompt | 25" Net Lag |
|---|---|---|---|---|---|---|---|---|---|---|
| 10B | Vit. C | $N_2$ | 900 | 15 | sonic Water | Belt | 1.49 | 0 | 2.66 | 0.35 |
| 10C | Vit. C | $N_2$ | 900 | 60 | " | Belt | 1.20 | 0 | 2.47 | 0.34 |
| 10D | Vit. C | $N_2$ | 930 | 60 | " | Belt | 1.07 | 0 | 2.47 | 0.58 |
| 11 | Graphite | $N_2$ | 880 | 60 | Dry Mill −200 Mesh | Tube | 1.26 | 0 | | |
| 12 | Graphite | $N_2$ | 880 | 60 | Ultrasonic Water −200 Mesh | Tube | 1.20 | 0 | | |
| 13 | Vit. C | $N_2$ | 880 | 30 | Ultrasonic Water | Belt | 1.33 | 0.02 | 2.59 | 0.43 |
| 14A | | $N_2$ | 900 | 60 | Dry Mill | Tube | | | 2.68 | 0.06 |
| 14B | | $N_2$ | 900 | 15 | " | Tube | | | 2.60 | 0.05 |
| 14C | | $N_2$ | 850 | 15 | " | Tube | | | 2.68 | 0.05 |
| 14D | | $N_2$ | 800 | 15 | " | Tube | | | 2.69 | 0.02 |
| 14E | | $N_2$ | 750 | 15 | " | Tube | | | 2.60 | 0.02 |
| 15A | Vit. C | $N_2$ | 880 | 60 | Ball Milled F/M 200 ml 1 Hr. −200 Mesh | Belt | 1.17 | 0 | — | — |
| 15B | Vit. C | $N_2$ | 900 | 60 | " | Belt | 1.37 | 0 | — | — |
| 15C | Vit. C | $N_2$ | 900 | 30 | " | Belt | 1.34 | 0 | — | — |
| 15D | Vit. C | $N_2$ | 900 | 15 | " | Belt | 1.26 | 0 | — | — |
| 16 | Graphite | $N_2$ | 880 | 60 | Ultrasonic Water | Tube | 1.34 | 0 | — | — |
| 17 | Graphite | $N_2$ | 880 | 60 | " | Tube | 1.11 | 0 | — | — |
| 18A | Graphite | $N_2$ | 880 | 60 | Water Wash Acetone Wash −200+325 Mesh | Tube | 1.24 | 0.01 | 2.58 | 0.47 |
| 18B | Vit. C | $N_2$ | 880 | 30 | " | Belt | 1.20 | 0.01 | 2.32 | 0.27 |
| 19 | Graphite | $N_2$ | 600 | 60 | Dry Mill −200Mesh | Tube | — | — | 0.96 | 0.09 |
| 20 | Graphite | $N_2$ | 900 | 60 | " | Tube | 1.46 | 0 | | |

The embodiments of the invention in which an exclusive property or privilege is claimed are defined as follows:

1. A method of making an X-ray phosphor with the formula

$$Ba_{1-x-y-z} Sr_x Eu_y R_z FCl$$

wherein x is from 0 to 0.1; y is from 0.0001 to 0.2;

z is from 0 to 0.1 and R is Sm, Dy, Bi, Sb, or Zn which comprises a. preparing an intimately mixed substantially stoichiometric mixture of appropriate metal chlorides and fluorides to form said composition including trivalent Eu, Sm, and Dy chlorides or fluorides, said mixture having at least 30% of particles below 1.5μ with the remainder of the particles having an average size less than 3μ as determined by an optical particle size analyzer, b. firing said mixture in an atmosphere consisting of nitrogen, the noble gases, carbon dioxide, or carbon monoxide to maintain a temperature in the range 600° to 950° C for a time sufficient to effect reaction including the reduction of trivalent Eu to the divalent state whereby a compacted mass of phosphor particles is formed and c. pulverizing said compacted mass.

2. Method of claim 1 whereby said mixture is fired to maintain a temperature between 750° C and 900° C, and z is 0.

3. Method of claim 2 wherein said mixture is formed by ball milling said metal chlorides and metal fluorides in from about 1 to 5 parts per part of said metal chloride and fluoride by weight of a liquid selected from acetone, trichlorotrifluoroethane or azeotropic mixtures of trichlorotrifluoroethane with ethanol, methanol or acetone, or an azeotropic mixture of tetrachloroethylene and 2-ethoxyethanol and separating and drying the ball milled metal chlorides and metal fluorides.

4. Method of claim 3 wherein said liquid is an azeotropic mixture of tetrachloroethylene and 2-ethoxyethanol.

5. Method of claim 2 wherein said mixture is formed by slurrying finely divided insoluble metal fluoride components in an aqueous solution of soluble metal chloride components, precipitating said metal chloride components by the addition of acetone, and separating and drying the finely divided insoluble metal fluoride components and precipitated metal chloride components.

6. Method of claim 2 wherein said mixture is formed by making a thick slurry of insoluble fluoride components in an aqueous solution of soluble chloride components and freeze-drying said slurry.

7. Method of claim 2 wherein said stoichiometric mixture of metal chlorides and fluorides is formed from $BaF_2$, $BaCl_2$ and $EuF_3$.

* * * * *